Patented Dec. 11, 1951

2,577,822

UNITED STATES PATENT OFFICE 2,577,822

CYCLODIENE ISOBUTYLENE COPOLYMERS

William J. Sparks and Robert M. Thomas, Westfield, N. J., assignors, by mesne assignments, to Jasco, Incorporated, a corporation of Delaware No Drawing. Application April 26, 1950,
Serial No. 158,338

7 Claims. (Cl. 260—80.7)

1

This invention relates to hydrocarbon polymers, and relates particularly to copolymers of isobutylene with cyclopentadiene. These novel copolymers are vulcanizable and have an unusually high resistance to oxidative degradation.

The present application is a continuation-in-part of application Serial No. 547,274, filed July 29, 1944, now abandoned, application Serial No. 300,336, filed October 20, 1939, now Patent 2,356,-128, and application Ser. No. 182,252, filed December 29, 1937, now Patent 2,356,127.

Copolymers have been prepared previously from an isoolefin such as isobutylene with a conjugated aliphatic diolefin such as butadiene or isoprene by a low temperature technique utilizing an active Friedel-Crafts catalyst such as aluminum chloride dissolved in a low freezing solvent such as methyl chloride. The preparation and properties of such copolymers are described, for example, in U. S. Patent 2,356,128, of which the aforesaid application Serial No. 547,274 is a continuation-in-part. These copolymers of isobutylene with aliphatic diolefins are rubber-like materials which excel natural rubber in some properties such as impermeability, but they tend to degrade somewhat too readily under the influence of heat and also, prior to vulcanization, they exhibit a rather high degree of viscous flow.

The present invention presents a new rubber-like material obtained by copolymerization of a major proportion of isobutylene with a minor proportion of a conjugated $C_5$ to $C_6$ cyclodiene, particularly cyclopentadiene having the formula

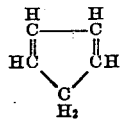

Other cyclodienes which may be found useful are methylcyclopentadiene, ethylcyclopentadiene, conjugated cyclohexadiene and methyl or ethyl substituted cyclohexadiene. The novel copolymers exhibit a surprising behavior on oxidation in that molecular weight of the cyclodiene copolymers increases whereas the molecular weight of copolymers of aliphatic diolefins decreases under similar circumstances. The difference in behavior can probably be explained in terms of basic polymer structure. A conventional copolymer of isobutylene and a straight-chain diolefin such as butadiene necessarily has a plurality of residual double bonds in the principal carbon chain as follows:

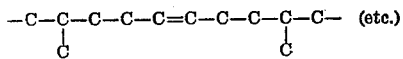

This structure makes the polymer susceptible to scission at the double bond so as to leave two independent fragments, each having a substantially lower molecular weight than the original polymer. In contrast, the novel cyclodiene copolymers have the residual double bonds outside of the principal carbon chain:

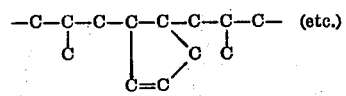

Thus, even when the double bond is split open, a side chain is formed thereby, but neither the length of the principal chain nor the total molecular weight are affected. Indeed, some of the broken double bonds apparently unite with similar units of other polymer molecules, with the result that the over-all molecular weight is increased.

In practicing the invention, a reaction mixture is prepared substantially as described in U. S. Patent 2,356,128, except that it is essential herein to use a conjugated cyclodiene as the diolefinic monomer. Usually about 0.5 to 50, preferably 1 to 10 parts by weight of cyclopentadiene are mixed with 100 parts by weight of isobutylene, and the resulting mixture is cooled to a polymerization temperature between —20° C. and —164° C., preferably —70° C. to —110° C. It is also desirable to dilute the reactants with a low-freezing, non-polymerizable diluent such as the various mono- or polyhalogenated alkanes, or a $C_2$ to $C_5$ aliphatic hydrocarbon or carbon disulfide or the like, it being merely necessary for the diluent that it be liquid at the polymerization temperature and non-reactive in the presence of the polymerization catalyst. Usually about 50 to 500 parts of diluent are added per 100 parts of isobutylene. Suitable diluents include ethylene, ethane, propane, butanes, pentanes, methyl chloride, ethyl chloride and ethylene chloride as well as the similar low-freezing fluoro-alkanes or fluoro-chloroalkanes.

Moreover, in addition to the ingredients mentioned above, the polymerizable feed may also contain about 0.2 to 3 parts of divinylbenzene. This is highly effective in raising the molecular weight of the polymeric product, but unlike in the copolymerization of aliphatic diolefins, such addition of divinylbenzene to cyclodiene feeds does not normally produce any gelation difficulties during the polymerization. Such tripolymers, e. g. isobutylene-cyclopentadiene-divinyl benzene, are claimed in copending application Ser. No. 243,366, filed August 23, 1951.

The cold material is then polymerized by the application thereto of a liquid Friedel-Crafts catalyst such as aluminum chloride in a low-freezing, non-complex forming solvent such as methyl or ethyl chloride or carbon disulfide; or with such metal halides as aluminum bromide or chloro-bromide, the light hydrocarbons such as the butanes are particularly useful catalyst solvents. The concentration of the catalyst solution may be between about 0.05 to 10%, usually between 0.1 and 2%. Normally about 0.1 to 3.0 grams of Friedel-Crafts halide is required to produce 100 grams of polymer.

The polymerization occurs promptly on addition of catalyst and can be conducted either in a succession of batch reactions or in a continuous reaction. In either case, the polymer is preferably recovered by discharging the polymerized material, usually at conversions ranging from 60 to 85% based on monomers, into a flash tank containing warm water which kills the catalyst, volatilizes out the unpolymerized monomers and the diluent if used, and converts the polymer from a slurry in cold reaction mixture into a slurry in warm water. Various slurry stabilizers and polymer stabilizers may be added to the flash tank. The polymer is then recovered by a straining operation followed by drying and hot milling.

As so prepared the polymer has a Staudinger molecular weight between 20,000 and about 100,000, preferably 45,000 to 65,000, and a Wijs iodine number between about 1 and 10, indicating that the polymer contains between about 0.3 and 6%, preferably 0.5 to 1.5% of combined cyclodiene as determined by ozonolysis at 0° C.

The polymer can be vulcanized with sulfur, especially in the presence of conventional vulcanization accelerators. Suitable accelerators include low molecular weight alkyl thiuram disulfides such as tetramethylthiuram disulfide, mercaptobenzothiazole, benzothiazyl disulfide, N-cyclohexyl-2-benzothiazole sulfenamide and the like. Other types of accelerators used for curing isobutylene copolymers of the GR-I type (e. g. 97% by weight of isobutylene and 3% by weight of isoprene) are also suitable. Carbon black, zinc oxide or other pigments or fillers, or plasticizers of the hydrocarbon type or of the ester type, and other conventional compounding ingredients may also be present. For example, a typical compounding recipe may consist of the following:

Isobutylene-cyclopentadiene copolymer, 100 parts, preferably 100 parts.
Zinc oxide, 0 to 10 parts, preferably 3 to 8 parts.
Sulfur and accelerator, 0.5 to 10 parts, sulfur preferably 0.1 to 3 parts; accelerator preferably 0.5 to 3 parts.
Carbon black, 0 to 100 parts, preferably 0 to 100 parts.

Vulcanization is obtained by heating the compound in a known manner, e. g. for 5 to 30 minutes at about 175 to 130° C.

Alternatively, it is possible to omit the sulfur and accelerator and to vulcanize the polymer with the aid of p-quinone dioxime or the like as described in U. S. 2,393,321; or vulcanization can be effected with the aid of a dinitroso-compound such as para- or meta-dinitrosobenzene.

When vulcanized, the polymer is rubber-like, elastic and in general resembles ordinary GR-I type rubber. Its pure gum vulcanizate has a tensile strength normally ranging from 1800 to 3000 pounds per square inch, and this value can be raised to 3600 or even 4500 pounds per square inch by the addition of suitable reinforcing agents such as carbon black. However, unlike ordinary GR-I, the cyclodiene copolymers of the invention stiffen upon oxidation, which phenomenon can be used as a means for reducing the viscous flow of unvulcanized polymer. Moreover, the peculiar character of the novel cyclodiene copolymers makes them especially well suited for use under oxidative conditions, e. g. as tire curing bags.

The invention is illustrated by the following examples wherein every reference to "parts" will be understood to mean "parts by weight" unless expressly stated otherwise.

*Example 1*

98 parts of liquid isobutylene were mixed with one part of cyclopentadiene and the resulting volume of reactants was diluted with 2 volumes of liquid ethylene. The mixture was prepared in a reactor equipped with a powerful stirring device and provided with a cover. The reactor also was well heat insulated to reduce the rate of volatilization of the refrigerant by ambient heat. The catalyst was prepared by dissolving commercial anhydrous aluminum chloride in methyl chloride at the boiling point of the methyl chloride to yield a saturated solution. This solution was then diluted with an additional amount of methyl chloride to produce a solution containing about 1.0% of dissolved aluminum chloride. This solution was then precooled to the temperature of the liquid ethylene, approximately −103° C., and sprayed on to the surface of the vigorously stirred mixed olefins through a misting nozzle. The polymerization proceeded rapidly and was approximately 80% complete in about 3 minutes.

When this stage of polymerization was reached, the polymerization mixture was diluted with approximately ½ volume of propyl alcohol to quench the catalyst and arrest polymerization. The solid polymer was then brought up to room temperature and was ready for further processing.

The copolymer of isobutylene and cyclopentadiene was then compounded according to the following formula:

| | Parts |
|---|---|
| Copolymer | 100 |
| Zinc oxide | 5 |
| Stearic acid | 3 |
| Sulfur | 3 |
| Tetramethyl thiuram disulfide | 1 |

In preparing this compound, the copolymer was worked briefly upon the mill for a time interval of approximately 5 minutes. Then the zinc oxide was added and thoroughly incorporated into the polymer by further working on the mill. Thereafter, the stearic acid and sulfur were simultaneously added, the mill temperature during this portion of the operation being maintained at approximately 125° C. When these ingredients were thoroughly incorporated, the mill was cooled to a temperature of approximately 90° C. and the accelerator added quickly, the compound removed from the mill and cooled.

This prepared compound was then placed in a mold and cured at a temperature of 155° C. for 60 minutes. A cured rubber-like polymer of moderate tensile properties was produced.

*Example 2*

A series of six polymerizations were conducted utilizing a reaction mixture consisting of 350 parts by volume of liquid isobutylene, 10.5 parts by volume of cyclopentadiene, and 500 parts by volume of liquid ethyl chloride for the first four, and a reaction mixture consisting of 350 parts by volume of liquid isobutylene, 23 parts by volume of cyclopentadiene and 500 parts by volume of liquid ethyl chloride for the fifth and sixth polymerizations. The catalyst used was a solution containing 0.24% of aluminum chloride in ethyl chloride. This catalyst solution was applied to the reaction mixture through a nebulizer at the rate of 32 parts by volume per minute, the delivery of catalyst being suspended when from 20% to 40% of the olefinic material had polymerized.

The polymer was separated as before from the residual reaction mixture, brought up to room temperature, washed with water to remove traces of catalyst, and compounded according to the formula set out in Example 1, and furthermore 10 or 50 parts of carbon black (Cabot #9) per 100 parts of polymer were added to the formula as indicated in the table below. The resulting batches of compound were divided into portions which were cured respectively for 10, 20, 40 and 60 minutes at 155° C.

Modulus, tensile strength, and elongation at break values were determined on these several compounds to yield the inspection record shown.

| Run No. | React. Temp. | Parts Carbon Black | Modulus at 300% (p. s. i.) | | | | Tensile Strength (p. s. i.) | | | | Elongation (Per Cent) | | | |
|---|---|---|---|---|---|---|---|---|---|---|---|---|---|---|
| | | | 10' | 20' | 40' | 60' | 10' | 20' | 40' | 60' | 10' | 20' | 40' | 60' |
| | °C. | | | | | | | | | | | | | |
| 1 | −100 | 10 | | 220 | 250 | 300 | | 760 | 1,200 | 1,300 | | 1,080 | 820 | 690 |
| 2 | −100 | 50 | 130 | 380 | 690 | 1,010 | 250 | 1,150 | 2,000 | 2,300 | 1,030 | 950 | 800 | 620 |
| 3 | −142 | 10 | 280 | 320 | 430 | 450 | 450 | 1,250 | 1,400 | 1,400 | 810 | 760 | 680 | 670 |
| 4 | −142 | 50 | 510 | 720 | 1,080 | 1,310 | 820 | 1,800 | 2,250 | 2,450 | 790 | 810 | 680 | 600 |
| 5 | −145 | 10 | 290 | 410 | 490 | 530 | 800 | 1,250 | 1,380 | 1,350 | 910 | 830 | 650 | 870 |
| 6 | −145 | 50 | 870 | 1,200 | 1,780 | 2,210 | 1,450 | 2,200 | 2,800 | 2,950 | 600 | 880 | 470 | 420 |

These results show the production of a very high-grade polymer of good tensile strength, good elongation and adequate modulus.

Example 3

A liquid feed was prepared by mixing 1000 grams methyl chloride, 270 grams of isobutylene and 30 grams of cyclopentadiene (freshly distilled from dimer). The resulting feed, which possessed a characteristic opalescence not apparent in the case of aliphatic feeds, was externally cooled to about −100° C. 220 grams of a catalyst solution containing 0.24 weight percent of aluminum chloride in methyl chloride were gradually added to the cold feed with stirring, over a period of 15 minutes. In this time, as the catalyst concentration was increasing, a vigorous polymerization reaction took place and was finally quenched by the addition of isopropyl alcohol 5 minutes after the last portion of the catalyst solution had been added. The reaction mixture was then dumped into warm isopropyl alcohol, the resulting polymer washed with boiling water on a kneader, and milled at 150° C. for 15 minutes in the presence of 0.5 gram of phenylbetanaphthylamine and 2 grams of zinc stearate, in order to remove all low boiling components therefrom.

In this manner 290 grams of dry polymer having an 8-minute Mooney viscosity of 34 were recovered. The polymer was then compounded according to the following recipe:

Polymer 100 parts, zinc oxide 5 parts, stearic acid 3 parts; tetramethylthiuram disulfide 1 part, mercaptobenzothiazole 0.5 part, sulfur 1.5 parts, EPC Black 50 parts.

When cured at 153° C. for the times indicated below, vulcanizates having the following physical properties were obtained:

| Cure | 40 Min. | 60 Min. | 90 Min. |
|---|---|---|---|
| Tensile, lbs./sq. in | 690 | 875 | 1,000 |
| Elongation, per cent | 475 | 420 | 400 |
| Modulus at 300% elongation | 725 | 850 | 1,000 |

Example 4

Following substantially the same procedure as described in Example 3, a polymer was prepared from the following feed:

| | Parts |
|---|---|
| Methyl chloride | 1000 |
| Isobutylene | 285 |
| Cyclopentadiene | 15 |
| Divinylbenzene (80% pure) | 3 |

When dumped into the hot quenching bath, an unusually fluffy and voluminous product was obtained, indicating that polymer constituted a highly effective barrier through which the methyl chloride and other low boiling constituents had great difficulty escaping.

In this run 285 grams of dry polymer having an 8-minute Mooney viscosity of 77 were obtained. When compounded and cured in the manner described in Example 3, vulcanizates having the following properties were obtained:

| Cure | 40 Min. | 60 Min. | 90 Min. |
|---|---|---|---|
| Tensile, lbs./sq. in | 940 | 1,125 | 1,250 |
| Elongation, per cent | 375 | 335 | 325 |
| Modulus at 300% elongation | 850 | 1,075 | 1,175 |

It is significant to observe that due to the modification with divinylbenzene, the polymer of this run had a substantially higher Mooney viscosity and molecular weight, as well as better physical properties than the polymer of Example 3. The tensile properties are particularly good considering the high degree of monomer conversion.

Example 5

Another run illustrating the beneficial modification of isobutylene-cyclodiene polymers by copolymerization with divinylbenzene was made with the following feed:

| | Parts |
|---|---|
| Methyl chloride | 1000 |
| Isobutylene | 285 |
| Cyclopentadiene | 15 |
| Divinylbenzene (80% pure) | 6 |

When polymerized by the procedure described in Example 3, 280 grams of dry polymer having an 8-minute Mooney viscosity of 82 were obtained. It is important to remark that neither in Example 4 nor in Example 5 was any gelation of the reaction mixture encountered. In contrast, it is well known that in the case of copolymers of isobutylene with aliphatic diolefins the reaction mixture tends to gel when as little as about 1 or 2% of divinylbenzene (based on other monomers) is present in the feed. This indicates that the reaction mechanism of isobutylene-cyclodiene-devinylbenzene feeds is quite different from similar feeds wherein the cyclodiene is replaced by an aliphatic diolefin. Thus, it is possible to modify clycodiene copolymers much more extensively with divinylbenzene, e. g. up to about 5 percent than similar aliphatic diene copolymers.

When the product of Example 5 was compounded and cured in the manner described in Example 3, vulcanizates having the following properties were obtained:

| Cure | 20 Min. | 40 Min. | 60 Min. | 90 Min. |
|---|---|---|---|---|
| Tensile, lbs./sq. in | 760 | 1,140 | 1,225 | 1,350 |
| Elongation, per cent | 320 | 320 | 320 | 285 |
| Modulus at 300% elongation | 725 | 1,100 | 1,170 | |

A comparison of the above data with those of the preceding example illustrates the beneficial effect of increasing divinylbenzene content.

Example 6

The application of the present invention to cyclodienes other than cyclopentadiene is illustrated by the following run wherein conjugated cyclohexadiene was used. In this instance a feed consisting of 1050 grams n-butane (diluent), 228 grams of isobutylene and 10 grams of cyclohexadiene-1,3 was polymerized at −100° C. by gradual addition of a catalyst solution containing 0.2 weight percent of aluminum chloride in methyl chloride. 111 grams of dry rubber-like polymer having 1.3 mole percent unsaturation and 30,600 Staudinger molecular weight were recovered. The product was vulcanizable and resembled the isobutylene-cyclopentadiene copolymers described earlier herein.

Example 7

The peculiar resistance of the novel cyclopentadiene copolymers to oxidative break down is illustrated by the following ozonolysis tests wherein various GR–I type copolymers of isobutylene and an aliphatic diolefin are compared with the cyclopentadiene of the invention. In making a test three solutions are prepared for each lot of polymer by dissolving 1.5 grams of the latter in 40 cc. of carbon tetrachloride. These solutions are then ozonized for 1, 2 and 4 hours, respectively, in accordance with the procedure described in Industrial and Engineering Chemistry, anal. ed., vol. 17, pp. 368–369.

The polymer used in this test was the one prepared from 350 parts by volume of isobutylene and 10.5 parts by volume of cyclopentadiene at about −100° C. as described above in Example 2. This polymer was compared with similar copolymers prepared in substantially the same manner except that various aliphatic diolefins were substituted in the reaction mixture for cyclopentadiene. The effect of the ozone treatment on the solutions of the several types of copolymers is summarized in the following table:

| Polymer | Effect of Ozone Treatment |
|---|---|
| Isobutylene-Cyclopentadiene | Solution of polymer sets up into a solid gel within the first hour |
| Isobutylene-Isoprene | Solution of polymer becomes more fluid; its viscosity decreases. |
| Isobutylene-Butadiene | Do. |
| Isobutylene-Dimethylbutadiene | Do. |

It can be seen from the above that the conventional copolymers of isobutylene with an aliphatic diolefin become degraded and their molecular weight breaks down upon oxidation whereas the cyclopentadiene copolymer does not break down and on the contrary its molecular weight is increased, probably due to the occurrence of cross-linking as suggested earlier herein.

Apart from the obvious advantage of obtaining a rubber-like material of increased oxidation resistance, the present invention has the further utility in that a vulcanizable material of reduced cold flow can be obtained by controlled oxidation of the cyclopentadiene copolymer, as described and claimed by L. M. Welch in copending application Serial No. 158,330, filed April 26, 1950. Moreover, by controlled oxidation of the novel cyclodiene polymers, a rubber-like material having a great capacity for various plasticizers can be obtained, as is likewise described in the stated copending application.

The foregoing specification describes the invention which relates to a new type of rubber-like material, namely to copolymers of isobutylene with a cyclodiene and to tripolymers of isobutylene, cyclodiene and divinylbenzene. But it will be understood, of course, that in addition to the specific illustrative examples listed above, numerous other embodiments are possible without departing from the scope of the invention disclosed and claimed herein.

We claim:

1. A synthetic solid plastic hydrocarbon copolymer of a major proportion of isobutylene and a minor proportion of a cyclodiene having a total of 5 to 8 carbon atoms and having two conjugated double bonds in a ring structure consisting of 5 to 6 carbon atoms.

2. A synthetic solid plastic hydrocarbon copolymer of a major proportion of isobutylene and a minor proportion of cyclopentadiene, the said copolymer being characterized by a Wijs iodine number between 0.5 and 50, a Staudinger molecular weight between 20,000 and 100,000, and reactivity with sulfur to yield an elastic product.

3. A synthetic solid plastic hydrocarbon copolymer of 0.5 to 15% of combined cyclopentadiene and 99.5 to 85% of combined isobutylene, the copolymer having a Staudinger molecular weight between 20,000 and 65,0000.

4. A vulcanized synthetic solid elastic copolymer of a major proportion of isobutylene and a minor proportion of cyclopentadiene, the vulcanized copolymer being characterized by a tensile strength between 800 and 4500 pounds per square inch.

5. A process of preparing a solid plastic hydrocarbon copolymer which comprises mixing 0.5 to 50 parts of cyclopentadiene with 100 parts of isobutylene, cooling the mixture to a temperature between −20° C. and −164° C. and at that temperature adding thereto a solution of an active Friedel-Crafts halide catalyst in an organic solvent which is liquid at the polymerization temperature and which does not form a complex with the catalyst.

6. A process of preparing a solid plastic hydrocarbon copolymer which comprises mixing 1 to 15 parts of cyclopentadiene with 100 parts of isobutylene and 50 to 500 parts of an inert liquid diluent, cooling the mixture to a temperature between —70° C. and —110° C. and adding thereto a solution of aluminum chloride catalyst in an alkyl chloride of 1 to 2 carbon atoms.

7. A product according to claim 1 wherein the cyclodiene is cyclohexadiene-1,3.

WILLIAM J. SPARKS.
ROBERT M. THOMAS.

REFERENCES CITED

The following references are of record in the file of this patent:

UNITED STATES PATENTS

| Number | Name | Date |
|---|---|---|
| 2,356,128 | Thomas et al. | Aug. 22, 1944 |